United States Patent
Sakaguchi

(10) Patent No.: US 9,591,243 B2
(45) Date of Patent: Mar. 7, 2017

(54) FOCUS DETECTING APPARATUS, CONTROL METHOD THEREOF, AND IMAGE-PICKUP APPARATUS

(71) Applicant: CANON KABUSHIKI KAISHA, Tokyo (JP)

(72) Inventor: Takeshi Sakaguchi, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/202,392

(22) Filed: Mar. 10, 2014

(65) Prior Publication Data

US 2014/0267843 A1 Sep. 18, 2014

(30) Foreign Application Priority Data

Mar. 12, 2013 (JP) ................................ 2013-049189

(51) Int. Cl.
| | | |
|---|---|---|
| H04N 5/232 | (2006.01) | |
| H04N 5/369 | (2011.01) | |
| G02B 7/28 | (2006.01) | |
| G02B 7/34 | (2006.01) | |

(52) U.S. Cl.
CPC ........... *H04N 5/3696* (2013.01); *G02B 7/285* (2013.01); *G02B 7/34* (2013.01); *H04N 5/23212* (2013.01)

(58) Field of Classification Search
USPC .......................................... 348/220.1, 221.1
See application file for complete search history.

(56) References Cited

U.S. PATENT DOCUMENTS

| | | | | |
|---|---|---|---|---|
| 5,216,314 A | * | 6/1993 | Suzuki | ..................... 310/323.05 |
| 8,866,955 B2 | | 10/2014 | Kawarada | |
| 2007/0206940 A1 | * | 9/2007 | Kusaka | ......................... 396/128 |
| 2010/0053418 A1 | * | 3/2010 | Irie | ............................... 348/345 |
| 2012/0138773 A1 | * | 6/2012 | Taniguchi | .................. 250/208.1 |

FOREIGN PATENT DOCUMENTS

| | | |
|---|---|---|
| CN | 102487432 A | 6/2012 |
| CN | 102694974 A | 9/2012 |
| JP | 62-133409 | 6/1987 |

OTHER PUBLICATIONS

Office Action dated Sep. 27, 2016, in Chinese Patent Application No. 201410090302.2.

* cited by examiner

*Primary Examiner* — Mark T Monk
(74) *Attorney, Agent, or Firm* — Fitzpatrick, Cella, Harper & Scinto

(57) ABSTRACT

A focus detecting apparatus includes a first image sensor configured to receive a light beam that has passed through an optical system and to output a first signal to be used for a focus detection by a phase difference detection method, a second image sensor configured to receive, by a masking device, a light beam narrower than that received by the first image sensor, which has passed through the optical system and to output a second signal to be used for the focus detection by the phase difference detection method, and a calculating circuit configured to calculate the focus detection by the phase difference detection method. In the focus detection calculation, a search range for an in-focus position using the first signal is wider than that using the second signal.

11 Claims, 11 Drawing Sheets

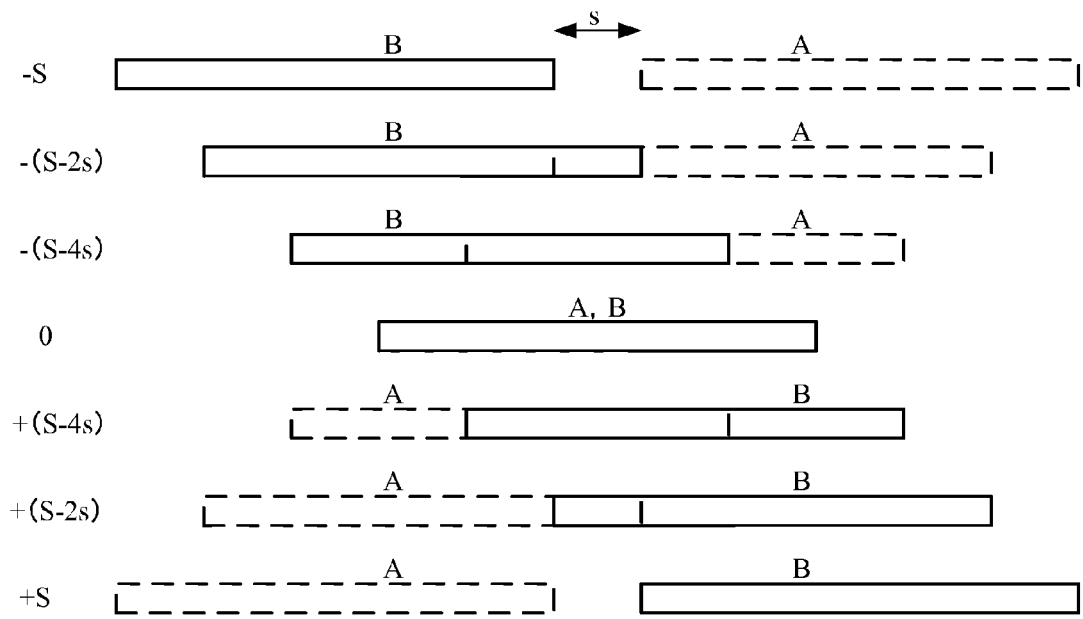
FIG. 7A
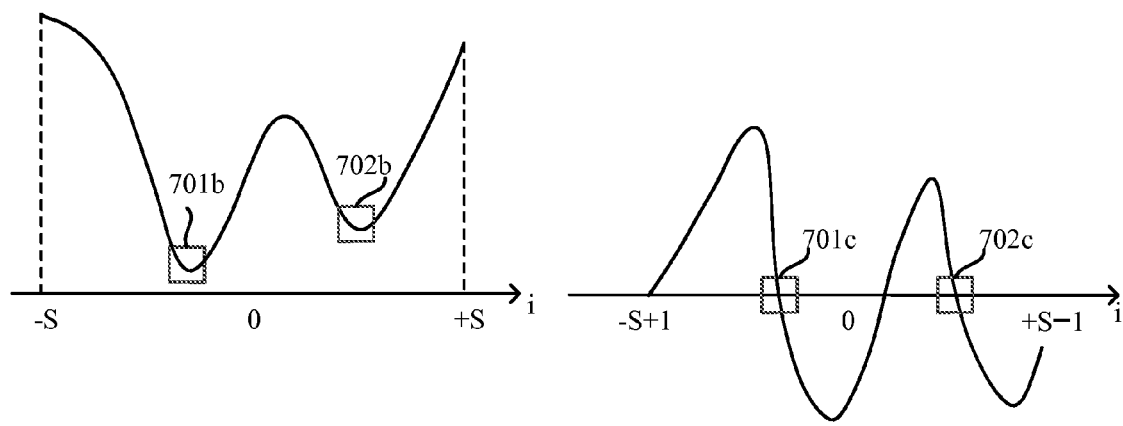
FIG. 7B
FIG. 7C

FOCUS DETECTING APPARATUS, CONTROL METHOD THEREOF, AND IMAGE-PICKUP APPARATUS

BACKGROUND OF THE INVENTION

Field of the Invention

The present invention relates to a focus detecting apparatus which adopts an image-pickup-plane phase-difference detection method.

Description of the Related Art

One of phase difference detection methods reimages, as a pair of secondary images, optical images formed through different pupil regions of an image-pickup optical system, by a secondary imaging optical system on a focus detecting sensor, different from an image sensor, and detects a focus state of the image-pickup optical system based on a relative distance between the pair of secondary images. This phase difference detection method is referred to as the so-called TTL (Through The Taking Lens) secondary imaging phase difference detection method. This secondary imaging phase difference detection method divides a pupil of an image-pickup optical system by projecting a pair of line sensors (focus detecting sensors) by a field lens included in a secondary imaging optical system, onto the pupil.

Japanese Patent Laid-Open No. ("JP") 62-133409 proposes a focus detecting apparatus which adopts this secondary imaging phase difference detection method and changes a calculation range for a correlation calculation based on defocus information of a lens in detecting a phase difference using the correlation calculation. The defocus information means a defocus amount from a current focus position to the infinity end and a defocus amount from the current focus position to the short distance end. An infinity-side shift amount is calculated based on a defocus amount from a current focus position to the infinity end, and on the K and G values. Similarly, a short-distance-side shift amount is calculated based on the defocus amount and on the K and G values. This method eliminates a wasteful calculation time by performing the correlation calculation in the defocus range detectable by the mounted lens.

Another phase difference detection method is the so-called image-pickup-plane phase-difference detection method which provides a pair of light-receiving elements for each of two-dimensionally arrayed micro lenses in an image sensor and divides a pupil of an image-pickup optical system by projecting the pair of light receiving elements onto the pupil.

In the image-pickup-plane phase-difference detection method, as the defocus amount increases, a detected defocus amount becomes larger than the actual value due to the image signal deterioration in addition to a phase shift. Therefore, when a shift range for the calculation is set based on the defocus amount of a lens similar to JP 62-133409, a shift position representative of an object position may be located outside the shift range, and a shift position representative of another object position within the shift range may be detected. In addition, a lens, which is to be driven based on its target driving amount calculated from a detected shift amount, may be driven by a defocus amount larger than the lens drivable amount.

SUMMARY OF THE INVENTION

The present invention provides a focus detecting apparatus that can reduce erroneous detections of a focus state of an image-pickup optical system using the image-pickup-plane phase-difference detection method.

A focus detecting apparatus as an aspect of the present invention includes a first image sensor configured to receive a light beam that has passed through an optical system and to output a first signal to be used for a focus detection by a phase difference detection method, a second image sensor configured to receive, by a masking device, a light beam narrower than that received by the first image sensor, which has passed through the optical system and to output a second signal to be used for the focus detection by the phase difference detection method, and a calculating circuit configured to calculate the focus detection by the phase difference detection method. In the focus detection calculation, a search range for an in-focus position using the first signal is wider than that using the second signal.

Further features of the present invention will become apparent from the following description of exemplary embodiments (with reference to the attached drawings).

BRIEF DESCRIPTION OF THE DRAWINGS

FIGS. 7A to 7C are diagrams for explaining the focus detection calculation processing according to this embodiment.

DESCRIPTION OF THE EMBODIMENTS

An embodiment of the present invention will be described in detail below with reference to the accompanying drawings. The embodiment described below is an example of realizing the present invention and thus may be modified or altered as appropriate according to a configuration of an apparatus to which the present invention is applied under various conditions. The present invention is not limited to the following embodiment.

Embodiment

Figure 1:
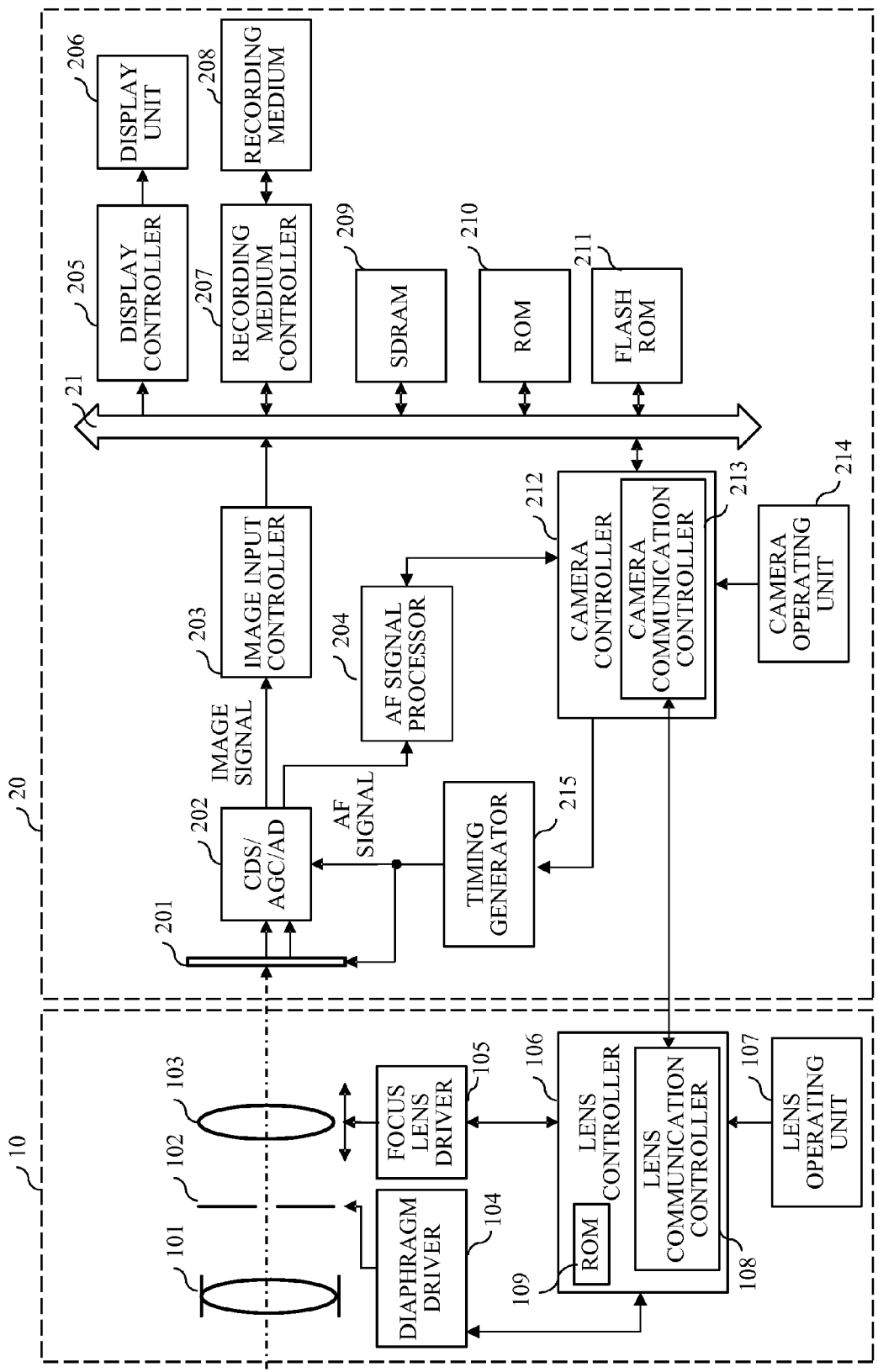
FIG. 1 is a block diagram of a camera system including a focus detecting apparatus according to this embodiment.

FIG. 1 is a block diagram illustrating a configuration of a lens-interchangeable camera system including a lens and a camera body according to this embodiment of the present invention. While the lens-interchangeable camera system (image-pickup apparatus) will be described in this embodiment, the present invention is applicable also to a lens-integrated image-pickup apparatus.

As illustrated in FIG. 1, a camera system according to this embodiment is constituted by a lens 10 (a lens unit) and a camera 20 (an image-pickup apparatus). The lens 10 includes a lens controller 106 configured to centrally control the entire operation of the lens 10. The camera 20 includes a camera controller 212 configured to centrally control the entire operation of the camera 20. The camera controller 212 and the lens controller 106 can communicate with each other via a camera communication controller 213 and a lens communication controller 108. When this embodiment of the present invention is applied to a lens-integrated image-pickup apparatus, the camera controller 212 may serve as all functions and units of the lens controller 106. In such a case, the camera controller 212 centrally controls the entire operation of the lens-integrated image-pickup apparatus.

A configuration of the lens 10 will now be described. The lens 10 includes a fixed lens 101, a diaphragm 102, a focus lens 103, a diaphragm driver 104, a focus lens driver 105, the lens controller 106, and a lens operating unit 107. In this embodiment, the fixed lens 101, the diaphragm 102, and the focus lens 103 constitute an image-pickup optical system. The fixed lens 101 is a fixed first lens unit closest to an object in the lens 10. The diaphragm 102 controls a light intensity incident upon an image sensor 201 described later and is driven by the diaphragm driver 104. The focus lens 103 is closest to an image-pickup plane in the lens 10, and driven in an optical-axis direction by the focus lens driver 105 for focusing of an image formed on the image sensor 201, which is described later. The diaphragm driver 104 and the focus lens driver 105, each of which are controlled by the lens controller 106, changes an F-value of the diaphragm 102 and the position of the focus lens 103 in the optical-axis direction, respectively. In response to a user operation through the lens operating unit 107, the lens controller 106 performs control according to the user operation. The lens controller 106 controls the diaphragm driver 104 and the focus lens driver 105 according to a control instruction or control information received via the camera communication controller 213 and the lens communication controller 108 from the camera controller 212 described later. The lens controller 106 sends lens control information (optical information) to the camera controller 212 via the lens communication controller 108 and the camera communication controller 213.

A configuration of the camera 20 will now be described. The camera 20 includes the image sensor 201, a CDS/AGC/AD converter 202, an image input controller 203, the camera controller 212, and a timing generator 215 so that it can obtain an image signal from a light beam that has passed through the image-pickup optical system. The camera 20 further includes an AF signal processor 204, a bus 21, a display controller 205, a display unit 206, a recording medium controller 207, a recording medium 208, an SDRAM 209, a ROM 210, a flash ROM 211, the camera communication controller 213, and a camera operating unit 214. The image sensor 201 is a photoelectric converter (photodiodes), such as a CCD sensor or a CMOS sensor. A light beam that has passed through the image-pickup optical system of the lens 10 or an object image is formed on a light receiving surface of the image sensor 201 and then converted into a signal charge depending on the intensity of the light beam by each photodiode. Each signal charge accumulated on the photodiodes is sequentially read as voltage signals (image signal/AF signal) from the image sensor 201 based on driving pulses given by the timing generator 215 according to the request of the camera controller 212.

Figures 2A, 2B:
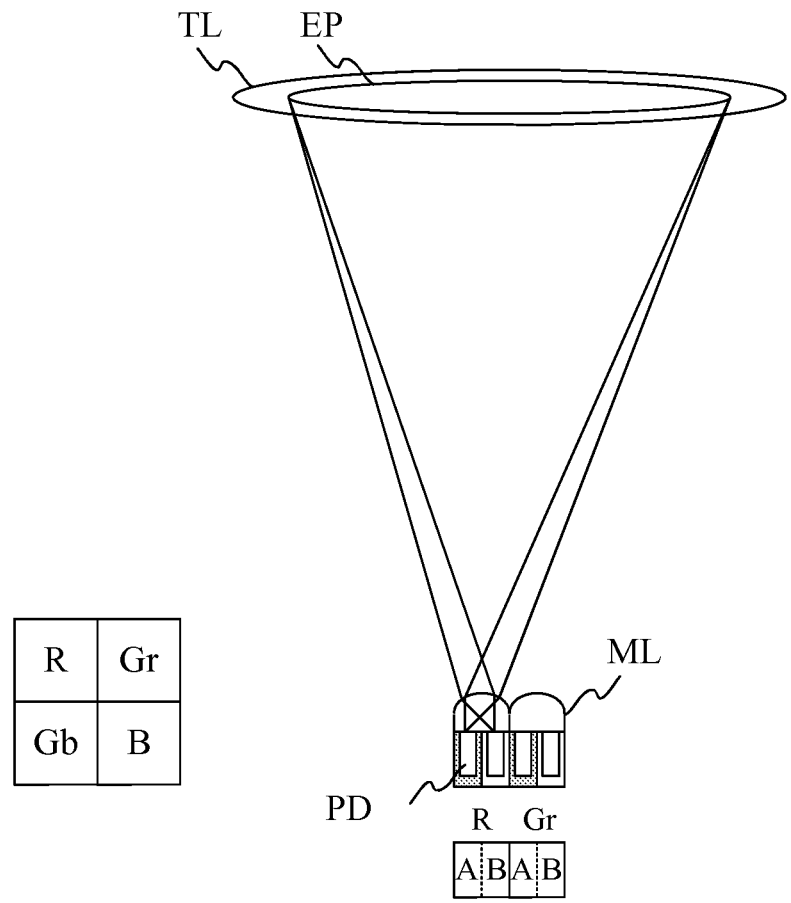
FIGS. 2A and 2B are schematic views illustrating a configuration of an image-pickup-plane phase-difference detection method according to this embodiment.

In this embodiment, the image sensor 201 includes, as illustrated in FIG. 2B, two photodiodes PDs for every one pixel for the image-pickup-plane phase-difference AF. Two types of signals, such as an image signal and an AF signal, can be extracted by splitting the light beam that has passed through the entire region of the exit pupil EP of the image-pickup optical system TL by each micro lens ML and by forming an image of each split light beam on the two photodiodes PDs. The sum of signals A and B of the two photodiodes PDs constitutes an image signal and the individual signals A and B are signals for the image-pickup-plane phase-difference AF. A focus detection is available on the entire region of the image-pickup plane by dispersedly arranging these pixels over the entire surface of the image sensor 201 or by providing first and second pixels, which are configured to photoelectrically convert corresponding light beams that have passed different pupil regions of the exit pupil of the image-pickup optical system. In the focus detection, the AF signal processor 204 described later calculates the correlation between two image signals based on the AF signal and calculates an image shift amount and various reliability information. FIG. 2A is an enlarged view of part of pixels of the image sensor 201 according to this embodiment, and this pixel arrangement is called the primary-color Bayer array. More specifically, this is a two-dimensional single-plate CMOS color image sensor on which primary color filters of R (Red), G (Green), and B (Blue) are arranged in the Bayer array. In FIG. 2A, R denotes an R pixel, B a B pixel, and each of Gr and Gb a G pixel.

The image signal and the AF signal are read from the image sensor 201, input to the CDS/AGC/AD converter 202, then subject to the correlated double sampling, gain adjustment, and digitalizing process so as to eliminate reset noises. The CDS/AGC/AD converter 202 outputs the image signal to the image input controller 203 and the image-pickup-plane phase-difference AF signal to the AF signal controller 204, respectively.

The image input controller 203 stores the image signal output from the CDS/AGC/AD converter 202 in the SDRAM 209. The display controller 205 then displays the image signal stored in the SDRAM 209 via the bus 21. In a recording mode of an image signal, the recording medium controller 207 stores the image signal in the recording medium 208. The ROM 210 connected to the bus 21 stores a control program to be executed by the camera controller 212, various data necessary for the control, and the like. The flash ROM 211 stores various setting information on operations of the camera 20, such as user setting information, and the like.

The AF signal processor 204 calculates the correlation between the two AF signals output from the CDS/AGC/AD converter 202 and calculates an image shift amount and reliability information (a two-image matching degree, a two-image sharpness, contrast information, saturation information, and scratch information). The AF signal processor 204 then outputs the calculated image shift amount and reliability information to the camera controller 212. The camera controller 212 notifies the AF signal processor 204 of a calculational setting change based on the obtained image shift amount and reliability information. For instance, the camera controller 212 enlarges a correlation calculating region when the image shift amount is large or changes a type of a band-pass filter according to the contrast information. The details of the correlation calculation will be described later with reference to FIGS. 6 to 12. A focus detecting apparatus according to the embodiment of the present invention includes at least the AF signal processor 204 described above and the camera controller 212 described later.

While this embodiment extracts a total of three signals, such as an image signal and two AF signals, from the image sensor 201, applicable methods are not limited to this method. In order to reduce a load of the image sensor 201, the control may extract, for example, two signals, such as one image signal and one AF signal, and then subtract a difference between them to generate another AF image signal.

The camera controller 212 communicates with and controls all internal components of the camera 20. In addition to processing in the camera 20, the camera controller 212 performs various camera functions in accordance with the user operations and inputs from the camera operating unit 214 such as power on/off, a setting change, recording starting, AF control starting, and recorded image confirmations. As mentioned above, the camera controller 212 communicates information with the lens controller 106 in the lens 10, sends a control instruction or information for the lens 10, and obtains (optical) information in the lens 10. As described above, the camera controller 212 serves as an obtaining unit configured to obtain optical information of the lens 10 (image-pickup optical system). The camera controller 212 serves also as a focus detection calculator configured to detect a focusing state of the image-pickup optical system and as a driving amount calculator configured to calculate, based on a focusing state of the image-pickup optical system, a driving amount used to drive the image-pickup optical system. The details thereof will be described later.

An operation of the camera 20 of FIG. 1 according to this embodiment will now be described.

Figure 3:
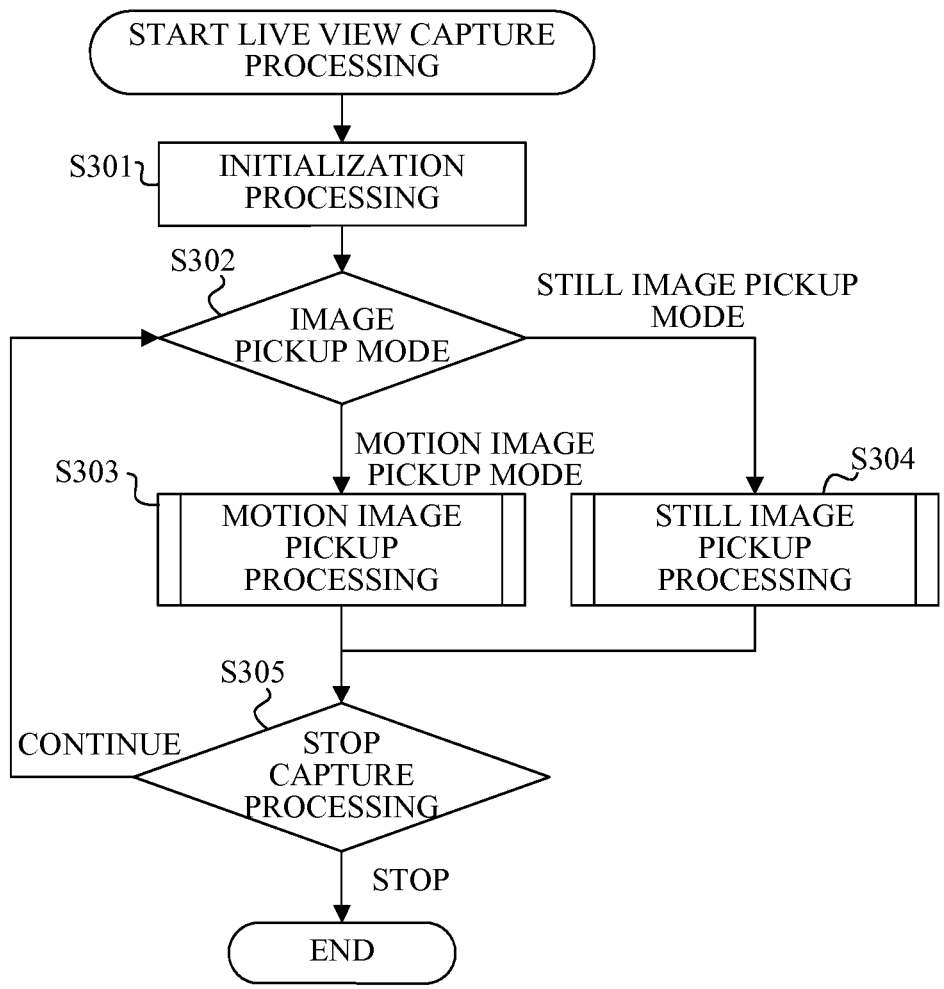
FIG. 3 is a flow diagram of a live-view-capture processing flow according to this embodiment.

FIG. 3 is a flowchart illustrating the procedure of image-pickup processing by the camera 20. The camera controller 212 performs initialization processing for the camera 20 in the step S301 and then the flow proceeds to the step S302. In the initialization processing, the camera controller 212 communicates with the lens 10 and obtains various optical information on the lens 10. The various optical information contains a defocus amount from a current focus position to an infinity end and a defocus amount from the current focus position to a short distance end, both of which are used in this embodiment. In this embodiment, the various optical information is stored in the lens-side ROM 109 in the lens controller 106. Various setting information on the operations of the camera 20 are read out of the flash ROM 211 such as user setting information. In the step S302, the camera controller 212 determines whether the image pickup mode of the camera 20 is a motion image pickup mode or a still image pickup mode. The flow proceeds to the step S303 when it is the motion image pickup mode and proceeds to step S304 when it is the still image pickup mode. In the step S303, motion image pickup processing is performed and then the flow proceeds to the step S305. The details of the motion image pickup processing in the step S303 will be described later with reference to FIG. 4. The flow moves to the step S304 when the still image pickup mode is selected, for still image pickup processing, and then the flow proceeds to the step S305. The details of the still image pickup processing in the step S304 will be described later with reference to FIG. 5. The flow moves to the step S305 after the motion image pickup processing in the step S303 or the still image pickup processing in the step S304, so as to determine whether or not the capturing processing has stopped. The flow moves to the step S302 when the capturing processing has not yet stopped, and ends the capture processing when it has stopped. The capture processing has stopped when a non-capturing operation is performed, such as power-off of the camera 20, changing of the image pickup mode, user setting processing of the camera 20, and reproduction processing so as to confirm the still or motion image.

Figure 4:
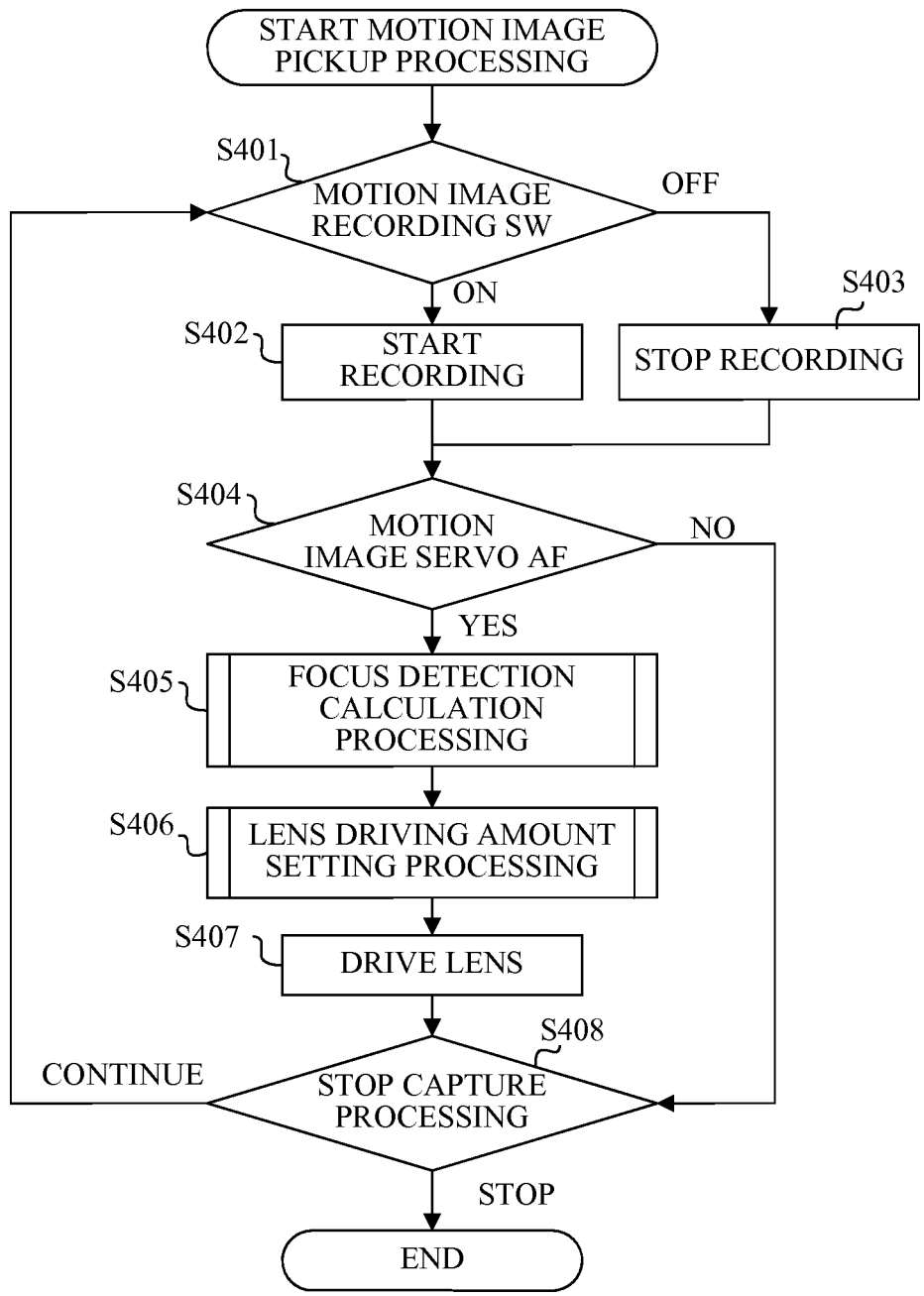
FIG. 4 is a flow diagram of motion image capture processing according to this embodiment.

Referring now to FIG. 4, a description will now be described of the motion image pickup processing in the step S303 in FIG. 3. The camera controller 212 performs motion image recording processing in the steps S401 to S403. The camera controller 212 determines, in the step S401, whether or not a motion image recording switch turns on, and the flow moves to the step S402 when the switch turns on and the flow proceeds to the step S403 when the switch turns off. This embodiment starts and stops the motion image recording by pressing the motion image recording button, other switching methods may be used.

In the step S404 after the motion image recording processing in the steps S401 to S403, it is determined whether a motion image servo AF is to be performed. The flow moves to the step S405 when the motion image servo AF is to be performed and the flow moves to the step S408 when the motion image servo AF is not to be performed. Herein, the motion image servo AF means an operation in which the camera controller 212 sequentially performs focus detection processing described later and drives the lens for continue focusing. The camera controller 212 sets the motion image servo AF when the initialization processing of the step S301 reads the setting information stored in the flash ROM 211 or performs the user setting processing of the camera 20. In the step S405, the focus detection (calculation) processing is performed, as detailed later. In the step S406, the focus state detected (calculated) in the step S405 is converted into a driving amount of the focus lens 103, as detailed later. In the step S407, the lens is driven according to the lens driving amount calculated in the step S406. In the step S408, it is determined whether the motion image pickup processing has stopped. The flow returns to the step S401 when the motion image pickup processing continues and the motion image pickup processing ends when it is to be discontinued.

Figure 5:
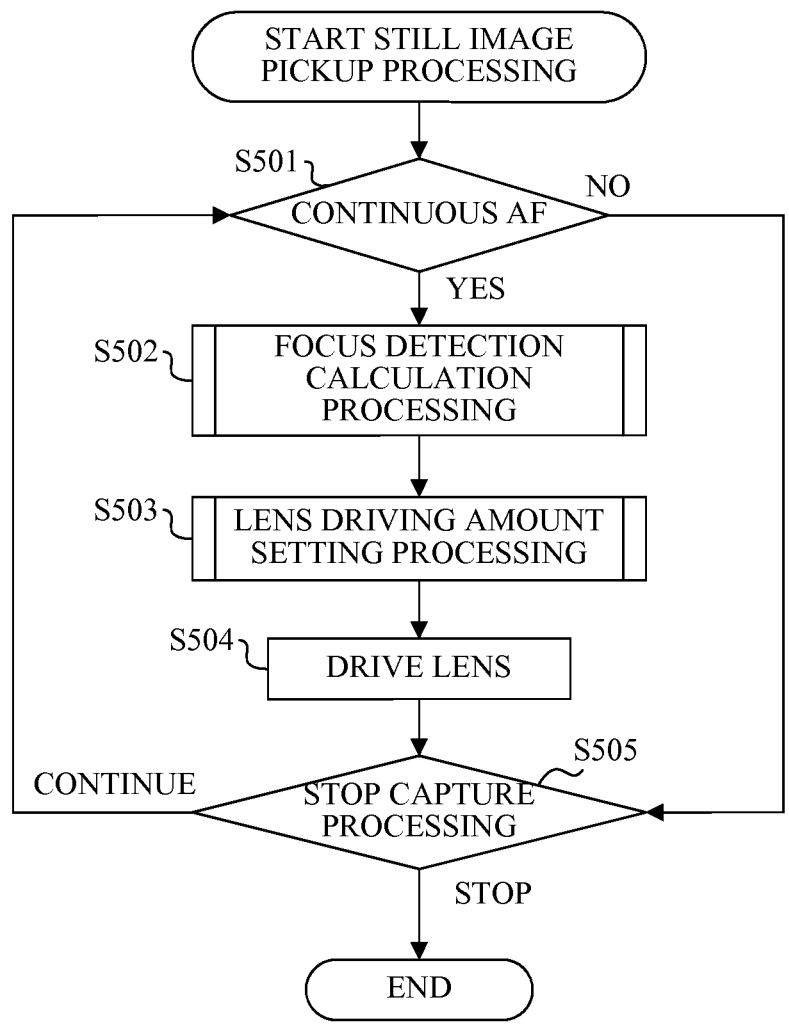
FIG. 5 is a flow diagram of still image capture processing according to this embodiment.

Referring now to FIG. 5, a description will be given of the still image pickup processing of step S304 of FIG. 3. In the step S501, whether continuous AF is to be performed is determined. The flow moves to the step S502 when the continuous AF is to be performed and the flow moves to the step S505 when the continuous AF is not to be performed. Herein, the continuous AF is a continuous focus detection processing described later so as to drive the lens continuous focusing. The continuous AF is set when the initialization processing of the step S301 reads the setting information stored in the flash ROM 211 or performs the user setting processing of the camera 20. In the step S502, the focus detection (calculation) processing is performed, as detailed later. In the step S503, the focusing state detected (calculated) in the step S502 is converted into a driving amount of the focus lens 103, as detailed later. In the step S504, the lens is driven according to the lens driving amount calculated in the step S503. In the step S505, whether the still image pickup processing has stopped is determined. The flow returns to the step S501 when the still image pickup processing is to continue and ends the still image pickup processing when it is to discontinue.

Figure 6:
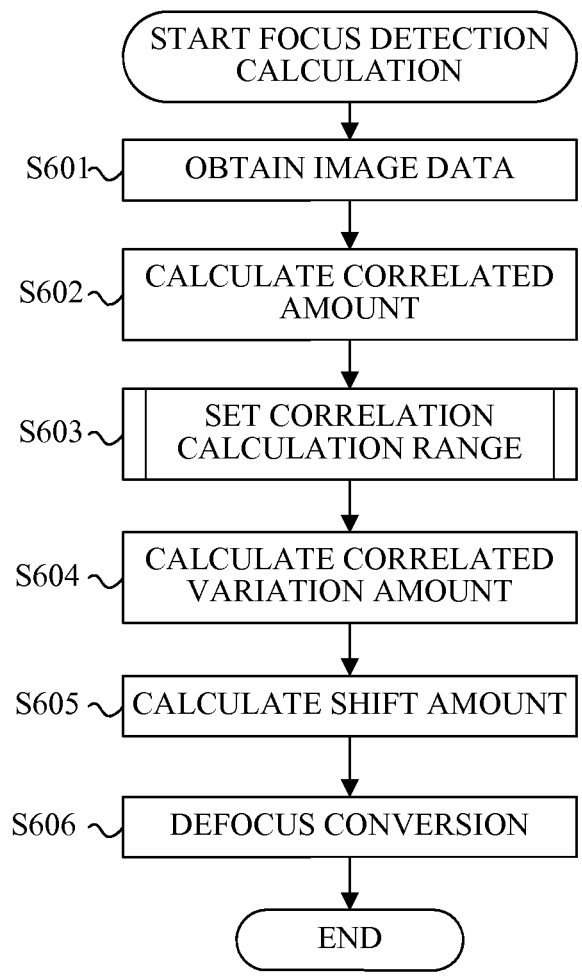
FIG. 6 is a flow diagram of a focus detection calculation processing according to this embodiment.

Referring now to FIG. 6, a description of the focus detection calculation processing of steps S405 and S502 of FIGS. 4 and 5. While this embodiment considers the focus detection calculation processing in the motion image pickup processing of step S405 and that in the still image pickup processing of the step S502 to be the same in the following description, the focus detection calculation processing may be different according to each capture processing.

First, an image signal is obtained from an arbitrary focus detecting region in the step S601. Then, a correlated amount is calculated in the step S602 based on the image signal obtained in the step S601. FIG. 7A illustrates that each of the image signals A and B is shifted by one bit from −S to +S where S is the maximum shift amount. FIG. 7A illustrates shift positions −S, −(S−2s), −(S−4s), 0, +(S−4s), +(S−2s), and +S when each of the image signals A and B is shifted by one bit. A correlated amount COR can be calculated based upon a sum of absolute values of a difference between the image signals A and B at each shift position. Where i is a shift amount and M is the number of pixels, a correlated amount can be calculated by the following Expression (1).

$$COR[i] = \sum_{k=0}^{M} |A[k+i] - B[k-i]| \quad (1)$$

FIG. 7B illustrates a correlated amount COR using a waveform. In the graph, an abscissa axis denotes a shift amount, and an ordinate axis denotes a correlated amount. Reference numerals 701b and 702b in FIG. 7B denote extreme-value regions. As the correlated amount is smaller, the matching degree increases between the image signals A and B is.

Next, in the step S603, a range used to detect a shift amount corresponding to a high matching degree between the image signals A and B based on the correlated amount calculated in the step S602 is set. An order of steps S602 and S603 may be exchanged so as to set the range used to shift the signals A and B, and then the correlated amount may be calculated in this range, as detailed later.

Next, in the step S604, a correlated variation amount is calculated based on the correlated amount calculated in the step S602. A calculation method of a correlated variation amount ΔCOR will be described. The correlated variation amount is calculated based on a difference between correlated amounts of alternate shifts in the correlated amount waveform of FIG. 7B. Where i is a shift amount, a correlated variation amount can be calculated by the following Expression (2).

$$\Delta COR[i] = COR[i] - COR[i+2] \quad (2)$$

FIG. 7C illustrates the correlated variation amount ΔCOR by a waveform. In the graph, an abscissa axis represents a shift amount and an ordinate axis represents a correlated amount. Reference numerals 701c and 702c in FIG. 7C denote ranges within which a value of the correlated variation amount changes from positive to negative. A shift position at which the correlated variation amount is 0 is called a "zero cross" where the matching degree between the image signals A and B becomes highest.

Next, in the step S605, a focus shift amount is calculated based on the correlated variation amount calculated in the step S604 and then converted into the defocus amount in the step S606.

Figure 8A:
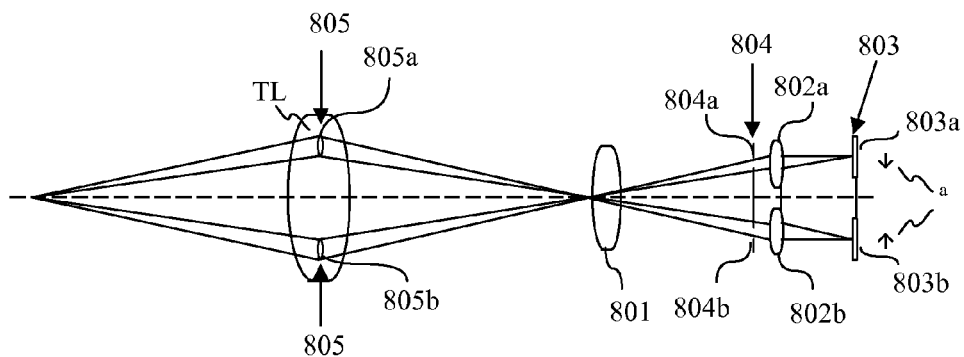
FIGS. 8A and 8B are diagrams for explaining optical characteristics of the image-pickup-plane phase-difference detection method according to this embodiment and a secondary imaging phase difference detection method.
Figure 8B:
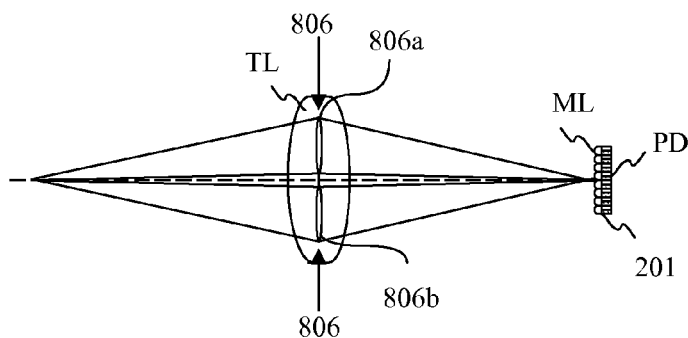

Referring now to FIGS. 8A and 8B, for the correlation calculation range setting in the step S603 of FIG. 6, a description will be given of the optical characteristic of the image-pickup-plane phase-difference detection method according to this embodiment which divides the pupil by each micro lens by comparing the optical characteristic with that of the secondary imaging phase-difference detection method which divides the pupil by a field lens. Those elements in FIGS. 8A and 8B, which are corresponding elements illustrated in FIGS. 1 and 2, are designated by the same reference numerals.

FIG. 8A schematically illustrates a pupil division in the secondary imaging phase-difference detection method. Reference numeral 801 denotes a field lens placed near an expected focal plane. Reference numerals 802a and 802b denote a pair of lenses which constitutes a secondary imaging system or lens. Reference numeral 803 denotes a photoelectric converter which includes two line sensor rows 803a and 803b corresponding to and arranged behind the pair of lenses 802a and 802b of the secondary imaging system (on the image plane side in the optical-axis direction). Reference numeral 804 denotes a diaphragm which includes a pair of apertures 804a and 804b corresponding to the pair of lenses 802a and 802b of the secondary imaging system. Reference numeral 805 denotes the exit pupil of the image-pickup optical system TL which includes two separated regions 805a and 805b.

In this configuration, the exit pupil 805 projects the diaphragm 804 and has a small diameter. The signal extracted from the photoelectrical converter 803 is less likely to blur and becomes sharp. In this type of configuration, a pair of focus detecting signals would substantially overlap each other when parallel moved, and an image signal of the line sensor row 803a is different only in phase from an image signal of the line sensor row 803b. For instance, even when the image-pickup optical system TL is significantly moved leftward (towards the object in the optical-axis direction) and a light beam is imaged on the left side of the image sensor 201, the pair of signals on the photoelectrical converter 803 move in directions indicated by arrows A without blurs. By detecting a relative shift amount of the pair of signals by the photoelectric converter 803, an in-focus state of the image-pickup optical system TL can be detected and its focusing driving is available. When the image-pickup optical system is moved rightward (toward the image plane in the optical-axis direction), the pair of signals on the photoelectrical converter 803 move in directions opposite to those of the arrows A in the drawing.

FIG. 8B schematically illustrates a pupil division of the image-pickup-plane phase-difference detection method. The micro lenses ML images two light beams that have passed different parts of the exit pupil of the image-pickup optical system TL on the image sensor 201 that is placed near the expected focal plane. Reference numeral 806 denotes an exit pupil of the image-pickup optical system TL which includes two divided regions 806a and 806b.

In such a configuration, the exit pupil 806 is projected by the micro lenses ML and has a large diameter. The signal extracted from each photodiode PD is likely to blur. In this type of configuration, the shapes of the two separated regions 806a and 806b have a back-to-back relationship and would not overlap each other by the parallel movement. Blurring shapes superimposed on the pair of image signals have similarly the back-to-back relationship, and the pair of image signals are different in shape and phase shift. Hence, when a defocus amount is large, the phase-difference detection of the image signals becomes difficult and a detection error of the defocus amount increases. For instance, when the image-pickup optical system TL is significantly moved leftward (toward the object in the optical-axis direction) and the light beam is imaged on the left side of the image sensor 201, the pair of signals on the photodiodes PD have the back-to-back relationship and are different in shape and phase shift. Therefore, when the defocus amount is large, a defocus amount larger than a phase shift amount is observed due to a signal distortion.

Figure 9:
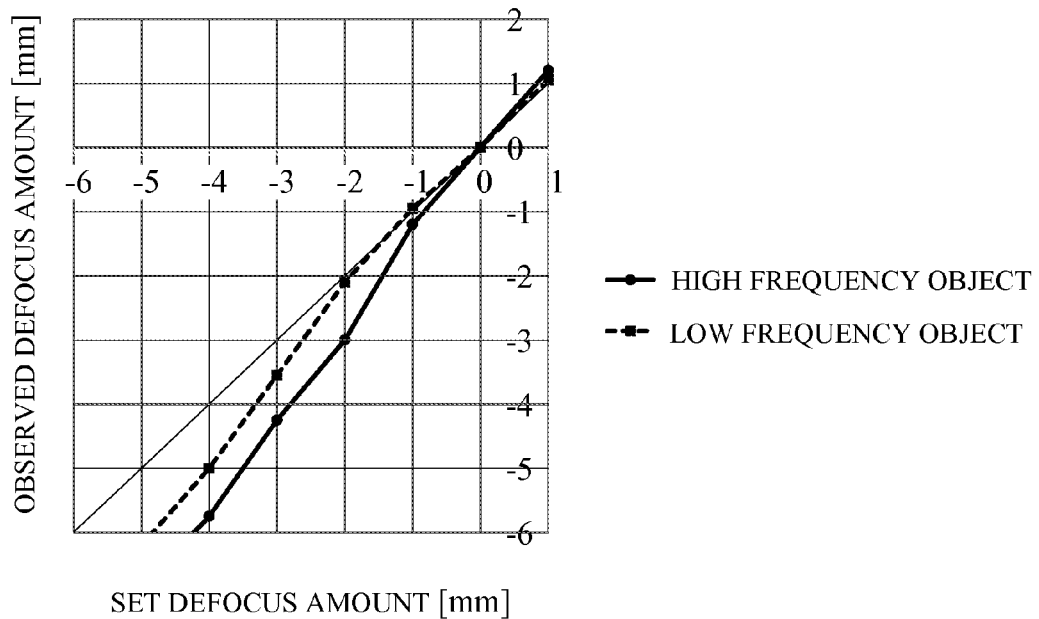
FIG. 9 is a diagram explaining a defocus amount observed by the image-pickup-plane phase-difference detection method according to this embodiment.

FIG. 9 illustrates a defocus amount (a characteristic of the image sensor) observed in the image-pickup-plane phase-difference detection method with a known defocus amount (a predetermined or set defocus amount). It is understood that as the defocus amount increases, a defocus amount larger than the set defocus amount is observed. It is also understood that a larger defocus amount than that of a low-frequency object is observed when a frequency component in the object is a high frequency because the signal more significantly deforms. In other words, a relationship between the set defocus amount and the observed defocus amount illustrated in FIG. 9 changes according to the contrast of the object. Data illustrated in FIG. 9 is stored in the ROM 210 in the camera 20.

Figure 10:
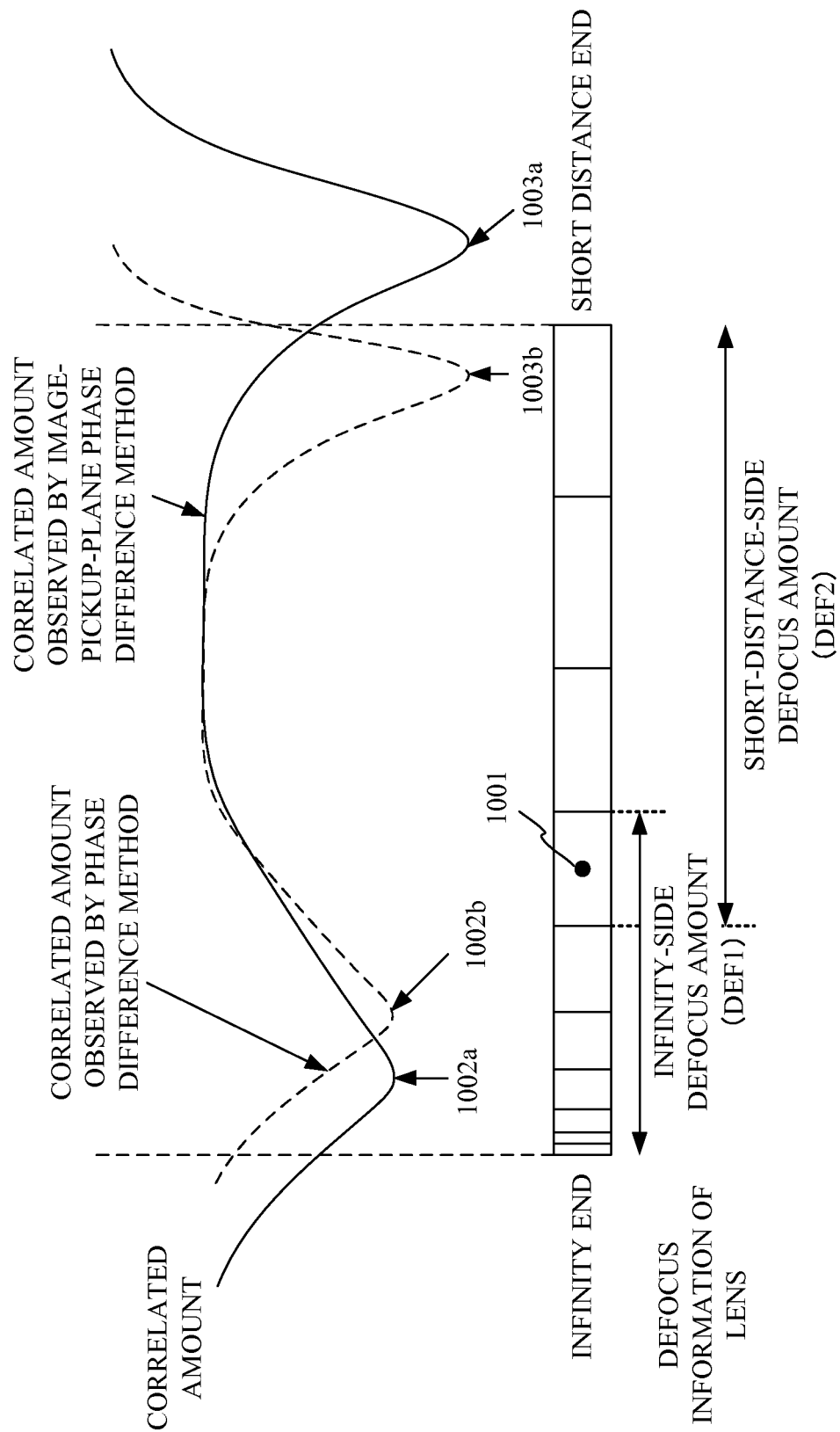
FIG. 10 is a diagram for explaining the relationship between the correlated amounts and the optical information on a lens for each of the image-pickup-plane phase-difference detection method according to this embodiment and the secondary imaging phase difference detection method.

Referring now to FIG. 10, a description will be given of the relationship between a defocus amount from a current focus position to a short distance end and a defocus amount from the current focus position to an infinity end, or an optical characteristic of the image-pickup-plane phase-difference detection method and the lens optical characteristic. Reference numeral 1001 denotes the current focus position as the lens optical characteristic. A defocus amount from the current focus position 1001 to the infinity end is represented by an infinity-side defocus amount DEF1. A defocus amount from the current focus position 1001 to the short distance end is represented by a short-distance-side defocus amount DEF2. The lens 10 is divided into a plurality of areas between the infinity end and the short distance end, and each area has an infinity-side defocus amount DEF1 and a short-distance-side defocus amount DEF2. A dotted line represents a correlated amount observed in the secondary imaging phase difference detection method. It is possible to detect, based on the current focus position 1001, a position 1002b that provides a high correlation in the infinity-end defocus amount detection range and a position 1003b that provides a high correlation in a short-distance-end defocus amount detection range. A solid line indicates a correlated amount observed by the image-pickup-plane phase-difference detection method. This method can detect, based on the current focus position 1001, the position 1002a that provides a high correlation in the infinity-end defocus amount detection range but cannot detect the position 1003a that provides a high correlation in a short-distance-end defocus amount detection range. When an actual object position is located near the position 1003a (not near the position 1002a), the image-pickup-plane phase-difference detection method cannot detect the position 1003a based on the current focus position 1001, and erroneously detects the position 1002a.

Figure 11:
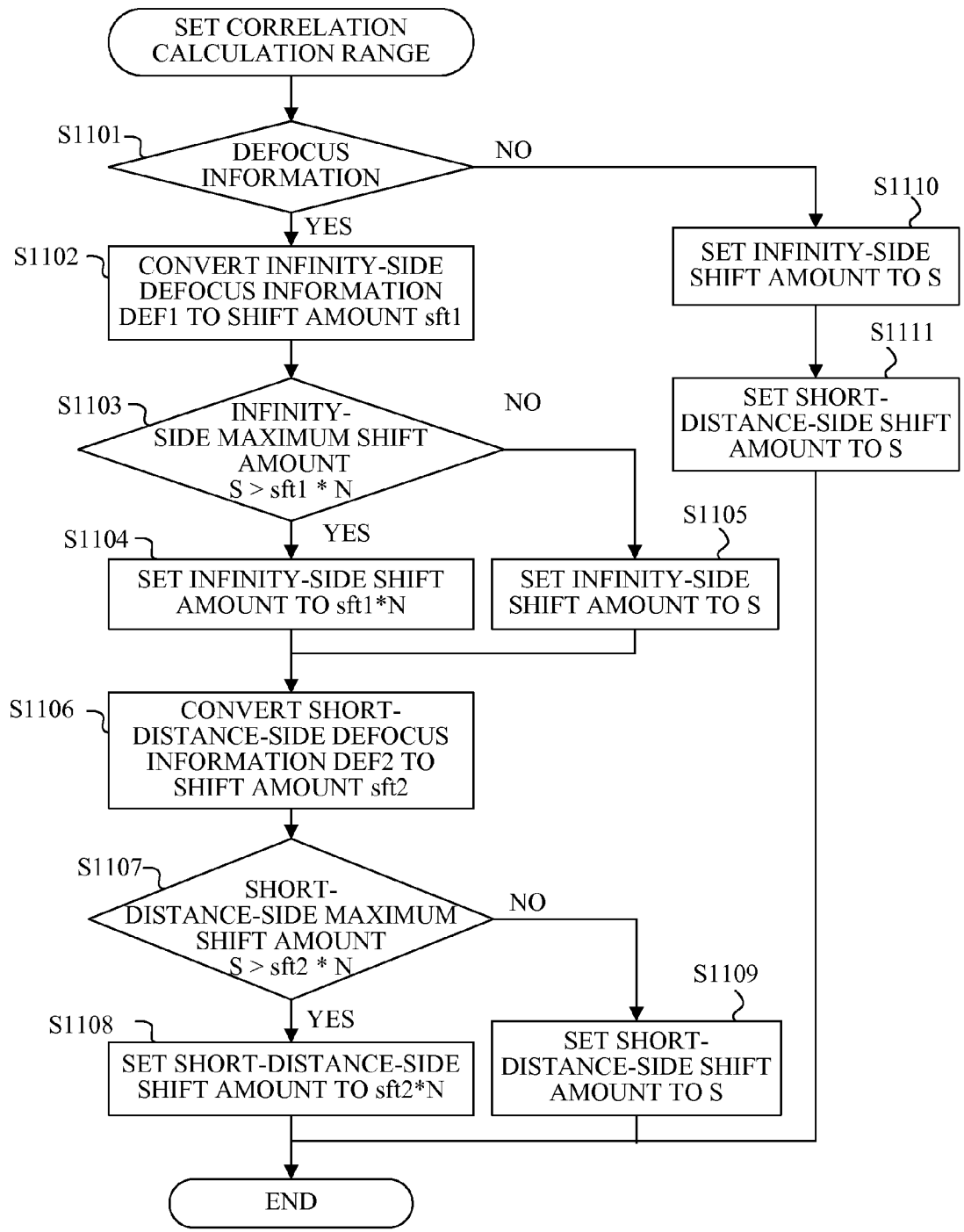
FIG. 11 is a flow diagram of correlation calculation range setting processing according to this embodiment.

Referring to FIG. 11, a description will be given of the correlation calculation range setting in the step S603. In the step S1101, the camera controller 212 determines whether or not the lens 10 has defocus information (optical information) on the infinity-side defocus amount DEFT from the current focus position 1001 to the infinity end and on the short-distance-side defocus amount DEF2 from the current focus position 1001 to the short distance end. The flow moves to the step S1102 when the lens 10 has the defocus information and the flow moves to the step S1110 when the lens 10 does not have the defocus information. In the step 1102, the infinity-side defocus amount is converted into a shift amount sft1 by using a K value. In the step S1103, an infinity-side maximum shift amount S is compared with the shift amount sft1×N, and the flow moves to the step S1104 when the shift amount sft1×N is smaller and the flow moves to the step S1105 when the shift amount sft1×N is equal or larger. N denotes a (predetermined) value calculated from the relationship between the observed defocus amount from FIG. 9 and the set defocus amount. The predetermined value N may be previously stored in the ROM 210 (memory) in the camera 20 or the like. In the step S1104, the infinity-side shift amount is set to sft1×N (a first shift amount). In other words, the infinity-side maximum shift amount S is limited. In the step S1105, the infinity-side shift amount to S is set. In the step S1106, the short-distance-side defocus amount DEF2 is converted into the shift amount sft2 by using a K value. In the step S1107, the short-distance-side maximum shift amount S is compared with the shift amount sft2×N, and the flow moves to the step S1108 when the shift amount sft2×N is smaller and the flow moves to the step S1109 when the shift amount sft2×N is equal or larger. In the step S1108, the short-distance-side shift amount is set to sft2×N (a second shift amount). In other words, the short-distance-side maximum shift amount S is limited. The short-distance-side shift amount is set to S in the step 1109, the infinity-side shift amount is set to S in the step S1110, and the short-distance-side shift amount is set to S in the step 1111, respectively. Thus, by setting the correlation calculation range, the erroneous detection of the focusing state can be reduced in the image-pickup-plane phase-difference detection method.

Figure 12:
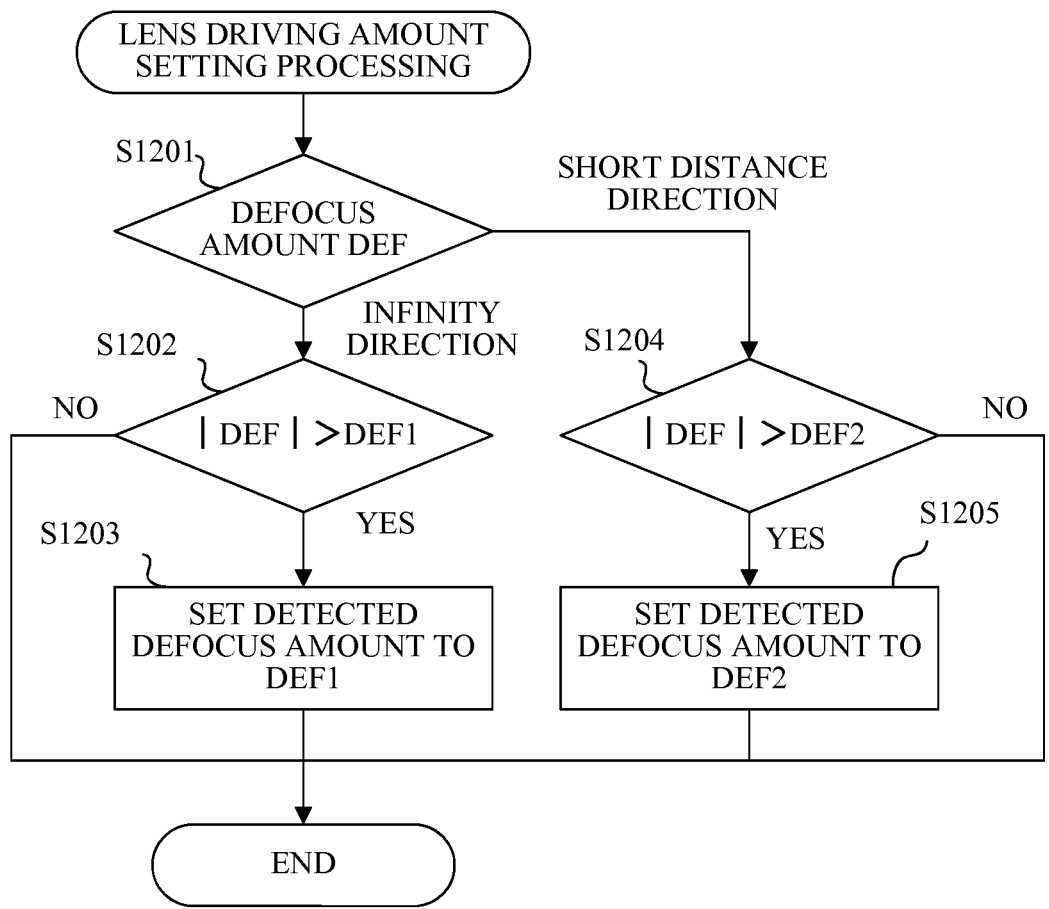
FIG. 12 is a flow diagram of lens driving amount setting processing according to this embodiment.

A description will now be given of the lens-driving-amount setting processing in the steps S406 and S503, with reference to FIG. 12. In the step S1201, the camera controller 212 determines whether a detected defocus amount DEF is located on the infinity side or on the short direction side, and the flow moves to the step S1202 when the detected defocus amount is located on the infinity side or the flow moves to the step S1204 when the detected defocus amount is located on the short distance side. In the step S1202, the camera controller 212 compares an absolute value of the detected defocus amount DEF with the infinity-side defocus amount DEF1 detected based on the current focus position, and the flow moves to the step S1203 when the detected defocus amount DEF is larger and ends the lens-driving-amount setting processing when the detected defocus amount DEF is equal or smaller. In the step S1203, the detected defocus amount is set to DEF1. In other words, the detected defocus amount DEF is limited. In the step 1204, the camera controller 212 compares an absolute value of the detected defocus amount DEF with the infinity-side defocus amount DEF2 detected based on the current focus position, and the flow moves to step S1205 when the detected defocus amount DEF is larger and ends the lens-driving-amount setting processing when the detected defocus amount DEF is equal or smaller. In the step S1205, the defocus amount is set to DFE2. In other words, the detected defocus amount DEF is limited. Thus, a lens driving amount is set and the lens can be driven with appropriate driving amount.

As described above, the camera 20 according to this embodiment can reduce errors in focusing state detection caused by the optical characteristic of the image sensor, by detecting the focusing state of the image-pickup optical system based on the defocus information of the image-pickup optical system and the optical characteristic of the image sensor. Thus, the driving amount of the image pickup optical system is operated based on the defocus information of the image pickup optical system, and the lens can be driven with appropriate driving amount.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment (s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention can reduce erroneous detections of a focus state of the image-pickup optical system by using the image-pickup-plane phase-difference detection method.

The present invention is applicable to a camera system such as a compact digital camera, a single lens reflex camera, and a video camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-049189, filed on Mar. 12, 2013, which is hereby incorporated by reference herein in its entirety.

What is claimed is:

1. A focus detecting apparatus which is capable of operating in a still image mode comprising:
a first image sensor configured to receive a light beam that has passed through an optical system and to output a first signal pair having parallax to be used for a focus detection by a phase difference detection method;
a second image sensor configured to receive, by a masking device, a light beam narrower than that received by the first image sensor, which has passed through the optical system and to output a second signal pair having parallax to be used for the focus detection by the phase difference detection method; and
at least one processor or circuitry which functions as:
a calculating unit configured to calculate the focus detection by the phase difference detection method,
wherein, in the focus detection calculation of the still image mode, a range used to detect a shift amount corresponding to a high matching degree between image signals consisting of the first signal pair is wider than a range used to detect a shift amount corresponding to a high matching degree between image signals consisting of the second signal pair.

2. The focus detecting apparatus according to claim 1, wherein the calculating unit is configured to calculate an amount by which the optical system is driven to the in-focus position.

3. The focus detecting apparatus according to claim 2, wherein the amount by which the optical system is driven is limited based on information sent from the optical system.

4. The focus detecting apparatus according to claim 3, wherein the information sent from the optical system contains an infinity-side defocus amount from a current focus position of the optical system to an infinity end and a short distance side defocus amount from the current focus position of the optical system to a short distance end.

5. The focus detecting apparatus according to claim 4, wherein the calculating unit is configured to convert the infinity-side defocus amount into a first shift amount, to compare a second shift amount obtained by multiplying the first shift amount by a predetermined value with an infinity-side maximum shift amount, and to limit the infinity-side maximum shift amount to the second shift amount when the second shift amount is smaller than the infinity-side maximum shift amount, and
wherein the calculating unit is configured to convert the short-distance-side defocus amount into a third shift amount, to compare a fourth shift amount obtained by multiplying the third shift amount by the predetermined value with a short-distance-side maximum shift amount, and to limit the short-distance-side maximum shift amount to the fourth shift amount when the fourth shift amount is smaller than the short-distance-side maximum shift amount.

6. The focus detecting apparatus according to claim 5, wherein the predetermined value is obtained from a difference between a predetermined defocus amount and a defocus amount which is detected by the first image sensor when the optical system is defocused by the predetermined defocus amount.

7. The focus detecting apparatus according to claim 5, wherein the predetermined value changes depending on a contrast of an object.

8. The focus detecting apparatus according to claim 5, further comprising a memory configured to store the predetermined value.

9. The focus detecting apparatus according to claim 1, wherein the range used to detect the shift amount corresponding to the high matching degree between image signals consisting of the first signal pair in a direction where the shift amount is detected is wider than the range used to detect the shift amount corresponding to the high matching degree between image signals consisting of the second signal pair in a direction where the shift amount is detected.

10. An image-pickup apparatus comprising:
a controller configured to obtain information of an optical system;
and a focus detecting apparatus which is capable of operating in a still image mode,
wherein the focus detecting apparatus includes:
a first image sensor configured to receive a light beam that has passed through the optical system and to output a first signal pair having parallax to be used for a focus detection by a phase difference detection method;
a second image sensor configured to receive, by a masking device, a light beam narrower than that received by the first image sensor, which has passed through the optical system and to output a second signal pair having parallax to be used for the focus detection by the phase difference detection method;
and at least one processor or circuitry which functions as:
a calculating unit configured to calculate the focus detection by the phase difference detection method,
wherein, in the focus detection calculation of the still image mode, a range used to detect a shift amount corresponding to a high matching degree between image signals consisting of the first signal pair is wider than a range used to detect a shift amount corresponding to a high matching degree between image signals consisting of the second signal pair.

11. A method of controlling a focus detecting apparatus which is capable of operating in a still image mode, the method comprising the steps of:
outputting a first signal pair having parallax to be used for a focus detection by a phase difference detection method from a first image sensor, the first image sensor being configured to receive a light beam that has passed through an optical system;
outputting a second signal pair having parallax to be used for the focus detection by the phase difference detection method from a second image sensor, the second image sensor being configured to receive, by a masking device, a light beam narrower than that received by the first image sensor, which has passed through the optical system; and
calculating, by a calculating circuit or a calculating processor, focus detection by the phase difference detection method,
wherein, in the focus detection calculation of the still image mode, a range used to detect a shift amount corresponding to a high matching degree between image signals consisting of the first signal pair is wider than a range used to detect a shift amount corresponding to a high matching degree between image signals consisting of the second signal pair.

* * * * *